US009904350B2

(12) United States Patent
Haruki et al.

(10) Patent No.: US 9,904,350 B2
(45) Date of Patent: Feb. 27, 2018

(54) CONTROL DEVICE AND COMPUTER PROGRAM PRODUCT

(71) Applicant: TOSHIBA MEMORY CORPORATION, Minato-ku, Tokyo (JP)

(72) Inventors: Hiroyoshi Haruki, Kanagawa (JP); Masaya Tarui, Kanagawa (JP); Koichi Fujisaki, Kanagawa (JP); Tetsuro Kimura, Tokyo (JP); Tatsunori Kanai, Kanagawa (JP); Junichi Segawa, Kanagawa (JP); Satoshi Shirai, Kanagawa (JP); Yusuke Shirota, Kanagawa (JP); Akihiro Shibata, Tokyo (JP); Shiyo Yoshimura, Kanagawa (JP); Haruhiko Toyama, Kanagawa (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 244 days.

(21) Appl. No.: 14/101,597

(22) Filed: Dec. 10, 2013

(65) Prior Publication Data

US 2014/0245045 A1    Aug. 28, 2014

(30) Foreign Application Priority Data

Feb. 28, 2013 (JP) ................................. 2013-039945

(51) Int. Cl.
*G06F 1/32* (2006.01)

(52) U.S. Cl.
CPC ............ *G06F 1/329* (2013.01); *G06F 1/3228* (2013.01); *G06F 1/3287* (2013.01);
(Continued)

(58) Field of Classification Search
CPC ..... G06F 1/00; G06F 1/04; G06F 1/12; G06F 1/26; G06F 1/32; G06F 11/30; G06F 15/16
See application file for complete search history.

(56) References Cited

U.S. PATENT DOCUMENTS

| 6,240,521 B1 * | 5/2001 | Barber ................. G06F 1/3203 713/323 |
| 8,806,241 B2 | 8/2014 | Shimizu et al. |

(Continued)

FOREIGN PATENT DOCUMENTS

| CN | 2840170 | 11/2006 |
| CN | 100397302 | 6/2008 |

(Continued)

OTHER PUBLICATIONS

Meisner et al, Powernap: Eliminating Server Idle Power, ASPLOS, 2009.

(Continued)

*Primary Examiner* — Thomas Lee
*Assistant Examiner* — Mohammad A Rahman
(74) *Attorney, Agent, or Firm* — Amin, Turocy & Watson LLP

(57) ABSTRACT

A recognition device includes a storage unit, an acquiring unit, a first calculator, a second calculator, a determining unit, and an output unit. The storage unit stores multiple training patterns each belonging to any one of multiple categories. The acquiring unit acquires a recognition target pattern to be recognized. The first calculator calculates, for each of the categories, a distance histogram representing distribution of the number of training patterns belonging to the category with respect to distances between the recognition target pattern and the training patterns belonging to the category. The second calculator analyzes the distance histogram of each of the categories to calculate confidence of (Continued)

the category. The determining unit determines a category of the recognition target pattern from the multiple categories by using the confidences. The output unit outputs the category of the recognition target pattern.

16 Claims, 17 Drawing Sheets

(52) U.S. Cl.
CPC ......... *Y02B 60/1282* (2013.01); *Y02B 60/144* (2013.01); *Y02B 60/32* (2013.01)

(56) References Cited

U.S. PATENT DOCUMENTS

| | | | |
|---|---|---|---|
| 2006/0259743 A1* | 11/2006 | Suzuoki | G06F 1/206 712/220 |
| 2009/0207423 A1 | 8/2009 | Shimizu et al. | |
| 2012/0246356 A1 | 9/2012 | Shibata et al. | |
| 2012/0246390 A1 | 9/2012 | Kanai et al. | |
| 2012/0246501 A1 | 9/2012 | Haruki et al. | |
| 2012/0246503 A1 | 9/2012 | Fujisaki et al. | |
| 2013/0031341 A1* | 1/2013 | Ganti | G06F 9/4401 713/2 |
| 2013/0073812 A1 | 3/2013 | Kanai et al. | |
| 2013/0080812 A1 | 3/2013 | Shirota et al. | |
| 2013/0080813 A1 | 3/2013 | Tarui et al. | |
| 2013/0091372 A1 | 4/2013 | Kimura et al. | |
| 2013/0152100 A1* | 6/2013 | Lee | G06F 9/4856 718/103 |
| 2013/0191670 A1 | 7/2013 | Haruki et al. | |
| 2013/0219203 A1 | 8/2013 | Fujisaki et al. | |
| 2013/0254773 A1 | 9/2013 | Kimura et al. | |
| 2013/0262898 A1* | 10/2013 | Preston | G06F 9/4418 713/323 |
| 2013/0268781 A1 | 10/2013 | Kanai et al. | |
| 2014/0013138 A1 | 1/2014 | Kanai et al. | |
| 2014/0013140 A1 | 1/2014 | Segawa et al. | |
| 2014/0075227 A1 | 3/2014 | Shirota et al. | |
| 2014/0077604 A1 | 3/2014 | Shibata et al. | |
| 2014/0089715 A1 | 3/2014 | Kimura et al. | |
| 2014/0139500 A1 | 5/2014 | Kimura et al. | |
| 2014/0181573 A1* | 6/2014 | Goss | G06F 13/40 714/5.11 |
| 2014/0245039 A1 | 8/2014 | Segawa et al. | |
| 2014/0245047 A1 | 8/2014 | Yoshimura et al. | |
| 2014/0358548 A1 | 12/2014 | Nakata | |

FOREIGN PATENT DOCUMENTS

| | | |
|---|---|---|
| JP | 2004-362426 | 12/2004 |
| JP | 2009-223866 | 10/2009 |
| JP | 2012-037977 | 2/2012 |

OTHER PUBLICATIONS

Rao, SeaMicro Technology Overview, Jan. 2012.
Chinese Office Action for Chinese Patent Application No. 201310676933.8 dated Feb. 3, 2016.
Taiwanese Office Action for Taiwanese Patent Application No. 102144251 dated Oct. 15, 2015.

* cited by examiner

FIG.4

| PROCESSOR IDENTIFIER | MEMORY LOCATION | MEMORY TYPE |
|---|---|---|
| 1 | 1 | NONVOLATILE |
| 1 | 2 | NONVOLATILE |
| 1 | 3 | VOLATILE |
| 1 | 4 | VOLATILE |
| 2 | 1 | NONVOLATILE |
| 2 | 2 | VOLATILE |
| 2 | 3 | VOLATILE |
| 2 | 4 | VOLATILE |
| 3 | 1 | NONVOLATILE |
| 3 | 2 | VOLATILE |
| 3 | 3 | VOLATILE |
| 3 | 4 | VOLATILE |
| 4 | 1 | VOLATILE |
| 4 | 2 | VOLATILE |
| 4 | 3 | VOLATILE |
| 4 | 4 | VOLATILE |

FIG.5

| PROCESSOR IDENTIFIER | MEMORY LOCATION |
|---|---|
| 1 | 1 |
| 1 | 2 |
| 1 | 3 |
| 1 | 4 |
| 2 | 1 |

FIG.9

| PROCESSOR IDENTIFIER | MEMORY LOCATION |
|---|---|
| 1 | 1 |
| 1 | 2 |
| 1 | 3 |

FIG.10

| PROCESSOR IDENTIFIER | MEMORY LOCATION |
|---|---|
| 2 | 1 |
| 3 | 1 |

FIG.17

| PROCESSOR IDENTIFIER | MEMORY LOCATION |
|---|---|
| 1 | 1 |
| 1 | 2 |
| 1 | 3 |
| 1 | 4 |
| 2 | 1 |
| 2 | 2 |
| 2 | 3 |
| 2 | 4 |
| 3 | 1 |
| 3 | 2 |
| 3 | 3 |
| 3 | 4 |
| 4 | 1 |
| 4 | 2 |
| 4 | 3 |
| 4 | 4 |

FIG.19

| PROCESSOR IDENTIFIER | TYPE |
|---|---|
| 1 | NONVOLATILE MEMORY |
| 2 | NONVOLATILE MEMORY |
| 3 | VOLATILE MEMORY |
| 4 | NONVOLATILE MEMORY |
| 5 | VOLATILE MEMORY |
| 6 | VOLATILE MEMORY |

CONTROL DEVICE AND COMPUTER PROGRAM PRODUCT

CROSS-REFERENCE TO RELATED APPLICATION

This application is based upon and claims the benefit of priority from Japanese Patent Application No. 2013-039945, filed on Feb. 28, 2013; the entire contents of which are incorporated herein by reference.

FIELD

Embodiments described herein relate generally to power saving for information processing devices.

BACKGROUND

Technologies for reducing power consumption of processing devices (such as servers) capable of executing one or more processes have been known in related art. For example, in an environment in which multiple servers operate, a method of reducing the entire power consumption by gathering processes to certain servers to increase the number of servers that stop operation is used.

Similarly, in a processing device including multiple processor cores, a method of reducing power consumption by causing certain processor cores to execute processes to increase the number of processor cores that stop operation is used.

In the meantime, a technology for suspending and resuming at high speed while reducing power consumption in a processing device (an embedded system, for example) capable of executing one or more processes is also known. For example, there is a method for suspending and resuming an embedded system at high speed by using a nonvolatile memory. There is also a method for causing a volatile memory to operate with minimum power that enables data retention and hibernating and resuming a system at high speed.

Energy saving of an information processing system including two or more processors each connected to one or more memories has not been sufficiently achieved. Power saving suitable for the configuration of each information processing system is required.

BRIEF DESCRIPTION OF THE DRAWINGS

FIG. 4 is a table illustrating an example of data stored in a memory configuration storage unit according to the first embodiment;

FIG. 5 is a table illustrating an example of data stored in a destination information storage unit according to the first embodiment;

FIG. 9 is a table illustrating an example of data stored in a system information storage unit according to the second embodiment;

FIG. 10 is a table illustrating an example of data stored in a task information storage unit according to the second embodiment;

FIG. 17 is a table illustrating an example of data stored in a memory configuration storage unit according to the modification;

FIG. 19 is a table illustrating an example of data stored in a memory configuration storage unit of a server in which one memory is connected to one processor according to the modification.

DETAILED DESCRIPTION

According to an embodiment, a control device includes a processor setting unit, a resumption data reading unit, and a resumption processing unit. The processor setting unit is configured to identify, among a plurality of processors included in an information processing system, each of which is connected to one or more memories, a processor connected to a memory storing resumption data for resuming the information processing system and to activate the identified processor, in response to a resumption request for resuming the information processing system from hibernation. The resumption data reading unit is configured to read the resumption data from the memory that stores the resumption data. The resumption processing unit is configured to resume the information processing system by using the read resumption data.

First Embodiment

Figure 1:
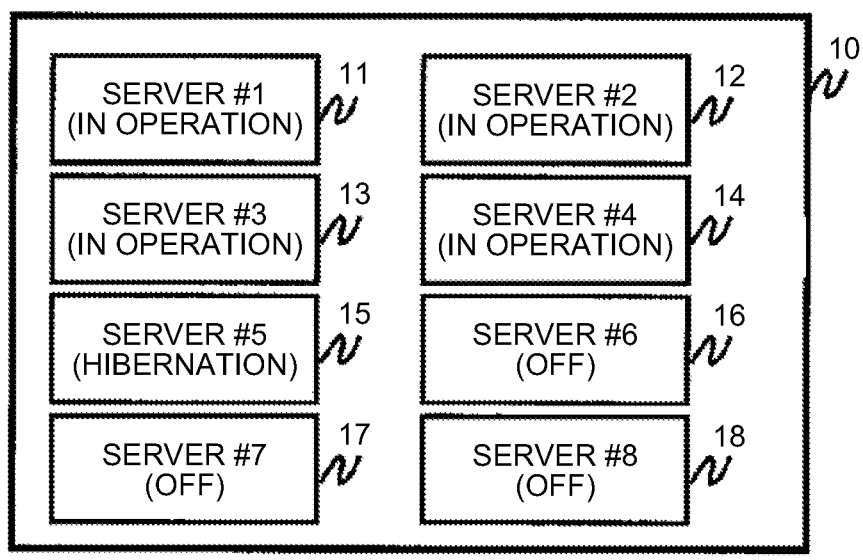
FIG. 1 is a block diagram illustrating a server group according to a first embodiment.

FIG. 1 is a block diagram illustrating an example of the schematic configuration of a server group 10 according to the present embodiment. As illustrated in FIG. 1, the server group 10 includes servers 11 to 18. FIG. 1 indicates that the servers 11 to 14 are currently in operation, a server 15 is in hibernation, and the other servers are powered off. The target system in the present embodiment is the server 15.

Figure 2:
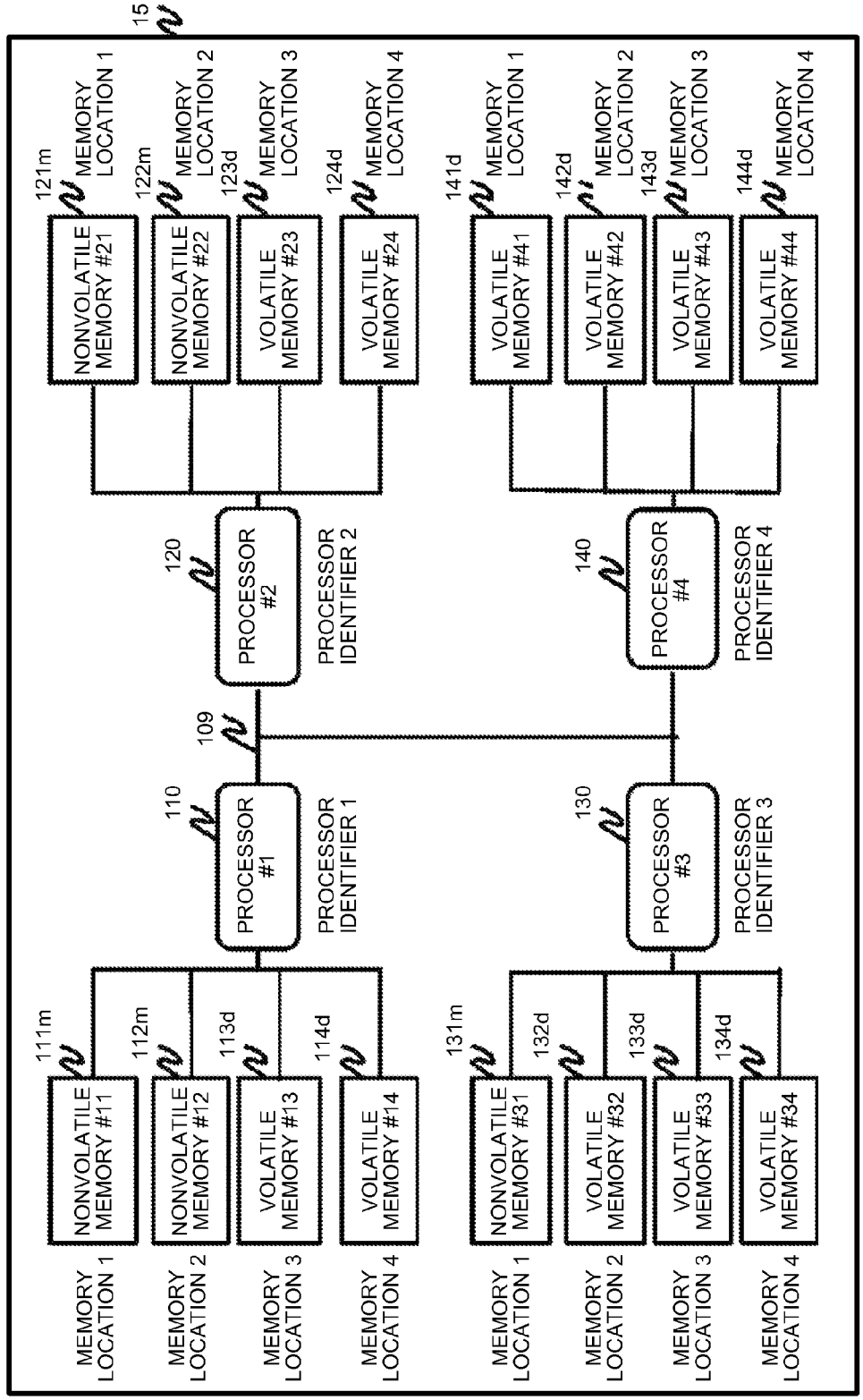
FIG. 2 is a block diagram illustrating an exemplary schematic configuration of a server according to the first embodiment.

FIG. 2 is a block diagram illustrating an example of the schematic configuration of the server 15 that is the target system in the present embodiment.

The server 15 includes four processors 110, 120, 130, and 140, which are connected to one another via a bus 109. Each of the processors is connected to four memories. Although the server 15 includes four processors in the present embodiment, the number of processors may be any number not less than two. Furthermore, although each processor includes four memories, the number of memories included in each processor may be any number not less than one.

The processor 110 is associated with a processor identifier 1. The processor 110 is connected to a nonvolatile memory 111*m*, a nonvolatile memory 112*m*, a volatile memory 113*d*, and a volatile memory 114*d*.

The processor 120 is associated with a processor identifier 2. The processor 120 is connected to a nonvolatile memory 121*m*, a volatile memory 122*d*, a volatile memory 123*d*, and a volatile memory 124*d*.

The processor 130 is associated with a processor identifier 3. The processor 130 is connected to a nonvolatile memory 131*m*, a volatile memory 132*d*, a volatile memory 133*d*, and a volatile memory 134*d*.

The processor 140 is associated with a processor identifier 4. The processor 140 is connected to a volatile memory 141*d*, a volatile memory 142*d*, a volatile memory 143*d*, and a volatile memory 144*d*.

A nonvolatile memory mentioned herein refers to a memory into which data can be written among memories capable of holding stored information while power is not supplied. Examples thereof include a MRAM (magnetoresistive random access memory) and a FeRAM (ferroelectric random access memory), but the nonvolatile memory is not limited thereto. On the other hand, a volatile memory mentioned herein refers to a memory that cannot hold stored information while power is not supplied. Examples thereof include a DRAM (dynamic random access memory), but the volatile memory is not limited thereto. The nonvolatile memories and the volatile memories store various data used by the processors.

A processing device has to keep supplying power sufficient for power retention in order that a volatile memory can hold data. For example, a DRAM set to a mode called a self-refresh mode can hold data with smaller power consumption.

Furthermore, each memory can be accessed only while the processor to which the memory is connected is in operation. For example, for accessing data in the nonvolatile memory 111*m* connected to the processor 110, the processor 110 has to be in operation.

Figure 3:
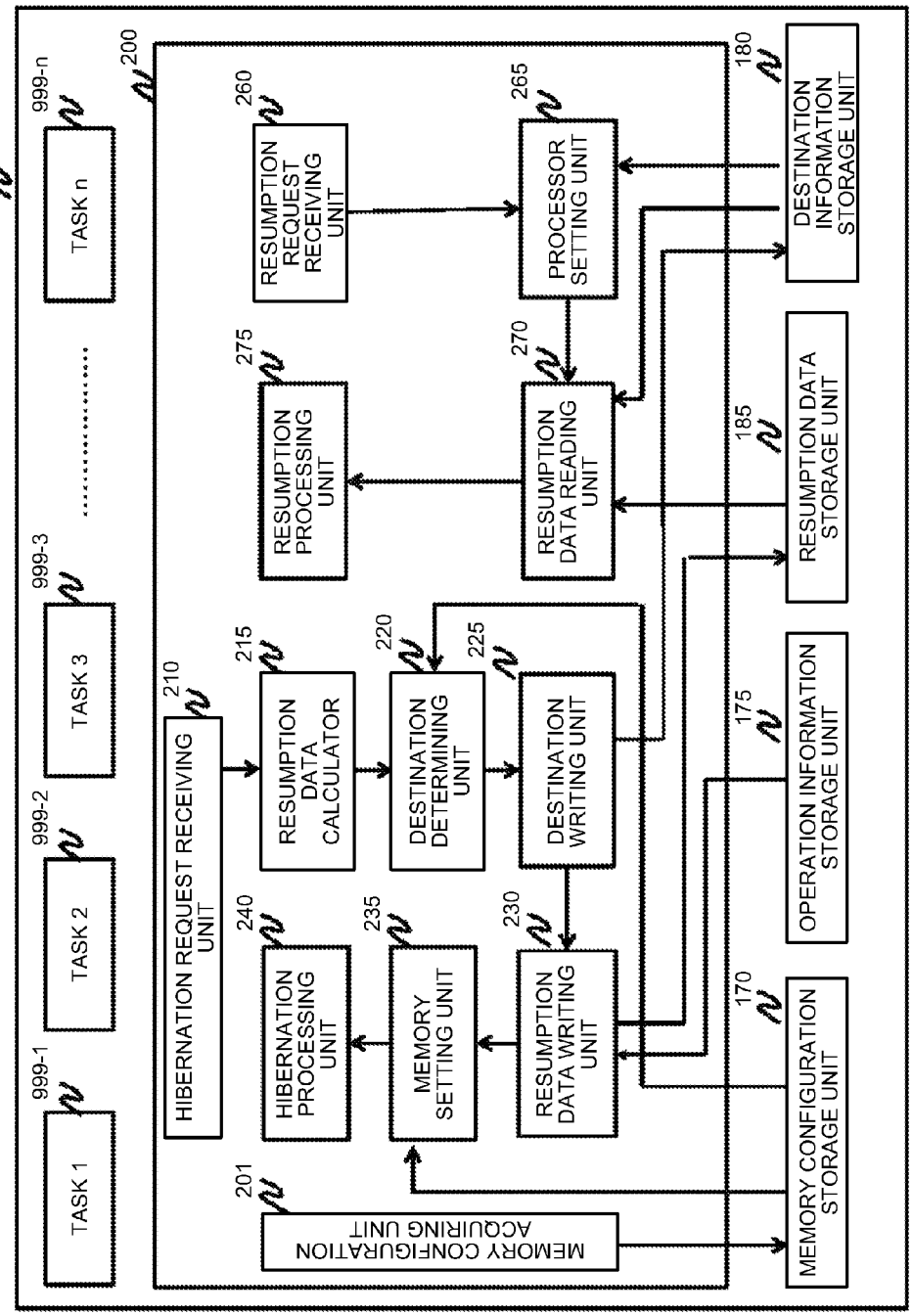
FIG. 3 is a diagram illustrating exemplary hardware and software configurations of a server according to the first embodiment.

FIG. 3 is a block diagram illustrating exemplary hardware and software configurations of the server 15. A control device 200 is realized by running programs on an operating system (OS) that is basic software. The control device 200 has multiple functions.

Herein, it can be deemed that a single OS runs on the server 15 and one or more tasks (999-1 to 999-*n*) run on the OS (the control device 200).

Furthermore, it is expressed in FIG. 2 that the server 15 includes the OS running on the server 15 with the hardware included in the server 15, and one or more tasks that run on the OS (the control device 200).

As illustrated in FIG. 3, the hardware included in the server 15 includes the memory configuration storage unit 170, an operation information storage unit 175, a destination information storage unit 180, and a resumption data storage unit 185.

The memory configuration storage unit 170, the operation information storage unit 175, the destination information storage unit 180, and the resumption data storage unit 185 are constituted by one or more memories (nonvolatile memories and volatile memories).

The memory configuration storage unit 170 stores a processor identifier that is an identifier of a processor to which a memory is connected, a memory identifier that is an identifier of the memory, and a memory type indicating whether the memory is nonvolatile or volatile in association with one another. A memory identifier may be a memory location indicating the number of the memory, for example. Although examples in which a memory identifier is a memory location will be described in the embodiments, the memory location may be read as a memory identifier.

The memory configuration storage unit 170 may store only a processor identifier and a memory location in association with each other.

FIG. 4 is a diagram illustrating an example of data stored in the memory configuration storage unit 170. In the example of FIG. 4, a combination in which the processor identifier is 1, the memory location is 1, and the memory type is nonvolatile, for example, indicates that a nonvolatile memory is connected at the memory location 1 of the processor with the processor identifier 1. Similarly, a combination in which the processor identifier is 2, the memory location is 2, and the memory type is volatile indicates that a volatile memory is at the memory location 2 of the processor with the processor identifier 2.

The operation information storage unit 175 stores operation information that is information required for processes performed by the processors. Examples of the operation information include a program itself to be executed by a processor, and data to be processed by a program to be executed.

The description is continued referring back to FIG. 3.

The destination information storage unit 180 stores a memory location indicating the location of a memory storing resumption data, which will be described later, and a processor identifier indicating a processor to which the memory storing the resumption data.

The resumption data storage unit 185 stores resumption data. Resumption data refers to data required for a server (system) to resume a process from hibernation. Examples of the resumption data include a program itself necessary for resumption, and data to be processed by a program.

FIG. 5 is a diagram illustrating an example of data stored in the destination information storage unit 180. In the example of FIG. 5, the destination information storage unit 180 stores the processor identifier 1 and memory locations 1 to 4 of memories connected to the processor having the processor identifier 1 in association with each other, and stores the processor identifier 2 and a memory location 1 of a memory connected to the processor having the processor identifier 2 in association with each other that are information on memories in which resume data is stored.

The description is continued referring back to FIG. 3 again. As illustrated in FIG. 3, the control device 200 is realized by running a program on the OS. The control device 200 includes a memory configuration acquiring unit 201, a hibernation request receiving unit 210, a resumption data calculator 215, a destination determining unit 220, a destination writing unit 225, a resumption data writing unit 230, a memory setting unit 235, a hibernation processing unit 240, a resumption request receiving unit 260, a processor setting unit 265, a resumption data reading unit 270, and a resumption processing unit 280.

The memory configuration acquiring unit 201 detects the processor identifier of a processor included in the server 15, and the memory locations and the memory types of one or more memories connected to the processor. The memory configuration acquiring unit 201 writes the detected processor identifier, memory locations and memory types in association with one another into the memory configuration storage unit 170.

The hibernation request receiving unit 210 detects a system hibernation request from a user or externally.

The resumption data calculator 215 calculates the amount of resumption data from the resumption data.

For example, the resumption data calculator 215 calculates the amount of resumption data at least on the basis of the amount of programs themselves and the amount of data processed by the programs.

The destination determining unit 220 determines one or more memories (destination memories) included in the resumption data storage unit 185 that stores the resumption data on the basis of various data stored in the memory configuration storage unit 170 and the data amount determined by the resumption data calculator 215. The resumption data storage unit 185 may store data other than the resumption data.

For example, various data include data in which a processor identifier, memory locations and memory types are associated with one another.

The destination determining unit 220 determines a destination memory that is a memory at least storing the resumption data. For example, the destination determining unit 220 may determine a destination memory so that the power consumption required to hibernate the system and the power consumption required to resume the system are minimized.

To reduce power for system resumption as much as possible, the destination determining unit 220 gives priority to that the processor to which the memory to be selected as the destination memory is connected will be the same processor. In this case, however, since a volatile memory may be selected as the destination memory, the power consumption for system hibernation will be increased by an amount corresponding to the power consumed to hold data in the volatile memory.

In contrast, to reduce power for system hibernation, the destination determining unit 220 gives priority to that the type of the memory to be selected as the destination memory will be a nonvolatile memory. In this case, however, the number of processors to be activated at system resumption will be increased and thus the power consumption at system resumption will be increased.

For example, if four memories are used as the destination memories in FIG. 2 and if it is selected to reduce power at system resumption, the destination determining unit 220 determines the nonvolatile memories 111$m$ and 112$m$ and the volatile memories 113$d$ and 114$d$ as the destination memories.

As a result, the processors that need to be activated at system resumption will be only the processor 110. Since, however, two of the memories to be used are nonvolatile memories, power for holding data at system hibernation has to be supplied to the memories.

In contrast, if it is selected to reduce power at system hibernation, the destination determining unit 220 determines the nonvolatile memories 111$m$, 112$m$, 121$m$, and 131$m$ as the destination memories. As a result, the processors that need to be activated at system resumption will be the processors 110, 120, and 130. Since, however, the memories to be used are all nonvolatile memories, power need not be supplied to the memories at system hibernation.

The destination writing unit 225 writes information on the determined storage memories into the destination information storage unit 180. Specifically, the destination writing unit 225 stores the memory locations of the determined destination memories and the processor identifiers of the processors to which the destination memories are connected in association with one another into the destination information storage unit 180.

The destination writing unit 225 sends the memory locations of the determined destination memories and the processor identifiers associated with the memory locations of the storage locations to the resumption data writing unit 230.

The resumption data writing unit 230 receives the memory locations of the destination memories and the processor identifiers associated with the memory locations of the destination memories from the destination writing unit 225. The resumption data writing unit 230 stores resumption data to be stored for system resumption into the destination memories determined by the destination determining unit 220. Specifically, the resumption data writing unit 230 reads out the resumption data out of operation information from the operation information storage unit 175, and stores the resumption data into the destination memories on the basis of the received memory locations of the destination memories and processor identifiers associated with the memory locations of the storage locations.

The resumption data writing unit 230 sends memory configuration information (the memory locations of the destination memories and the processor identifiers associated with the memory locations of the storage locations) relating to the resumption data storage unit 185 to the memory setting unit 235.

The memory setting unit 235 receives the memory locations of the destination memories and the processor identifiers associated with the memory locations of the storage locations from the resumption data writing unit 230.

The memory setting unit 235 acquires the memory types of the destination memories determined by the destination determining unit 220 from the memory configuration storage unit 170 on the basis of the received memory locations of the destination memories and processor identifiers associated with the memory locations of the storage locations, and sets the memories according to the memory types.

The memory setting unit 235 sets the destination memories into a state capable of saving power and holding data. For example, if a DRAM that is a volatile memory is used as a destination memory, the memory setting unit 235 sets the DRAM to a self-refresh mode. If a nonvolatile memory is used as a destination memory, the memory setting unit 235 powers the memory off. The memory setting unit 235 also powers the memories that are not selected to be destination memories.

The memory setting unit 235 then sends a system hibernation request to the hibernation processing unit 240.

The hibernation processing unit 240 receives the system hibernation request. The hibernation processing unit 240 also sets the memories into a state capable of saving power at the memory configuration storage unit 170 and the destination information storage unit 180 and holding data. The hibernation processing unit 240 further stops power supply to all the components included in the target system 15 except the destination memories necessary for a resumption process, the memory configuration storage unit, the destination information storage unit, and modules necessary for receiving a resumption request.

The modules necessary for receiving a resumption request are a processor (boot processor) in which the control device 200 is implemented and a memory (boot memory) storing codes and data necessary for receiving a resumption request.

The resumption request receiving unit 260 detects a resumption request. More specifically, the resumption request receiving unit 260 receives an interruption notification (a signal indicating that an interruption will occur) from inside or outside of the server 15.

The processor setting unit 265 reads out a processor identifier stored in the destination information storage unit 180 and activates the processor associated with the read processor identifier.

The processor setting unit 265 sends a request for reading resumption data to the resumption data reading unit 270.

The resumption data reading unit 270 in receipt of the request for reading resumption data reads out a processor identifier stored in the destination information storage unit 180, identifies the destination memory from the read processor identifier and the memory location, and reads out resumption data from the identified destination memory (resumption data storage unit 185). The resumption data reading unit 270 sends the read resumption data to a resumption processing unit 275.

The resumption processing unit 275 resumes the system and resumes tasks by using the resumption data read out by the resumption data reading unit 270. The resumption processing unit 275 may only resume the system by using the resumption data read out by the resumption data reading unit 270.

Processes performed by the resumption request receiving unit 260, the processor setting unit 265, the resumption data reading unit 270, the resumption processing unit 275 may be executed by a device other than the processors or one of the processors may be configured to receive the resumption request. In the embodiments, the processor activated to execute the resumption process will be referred to as a boot processor.

Figure 6:
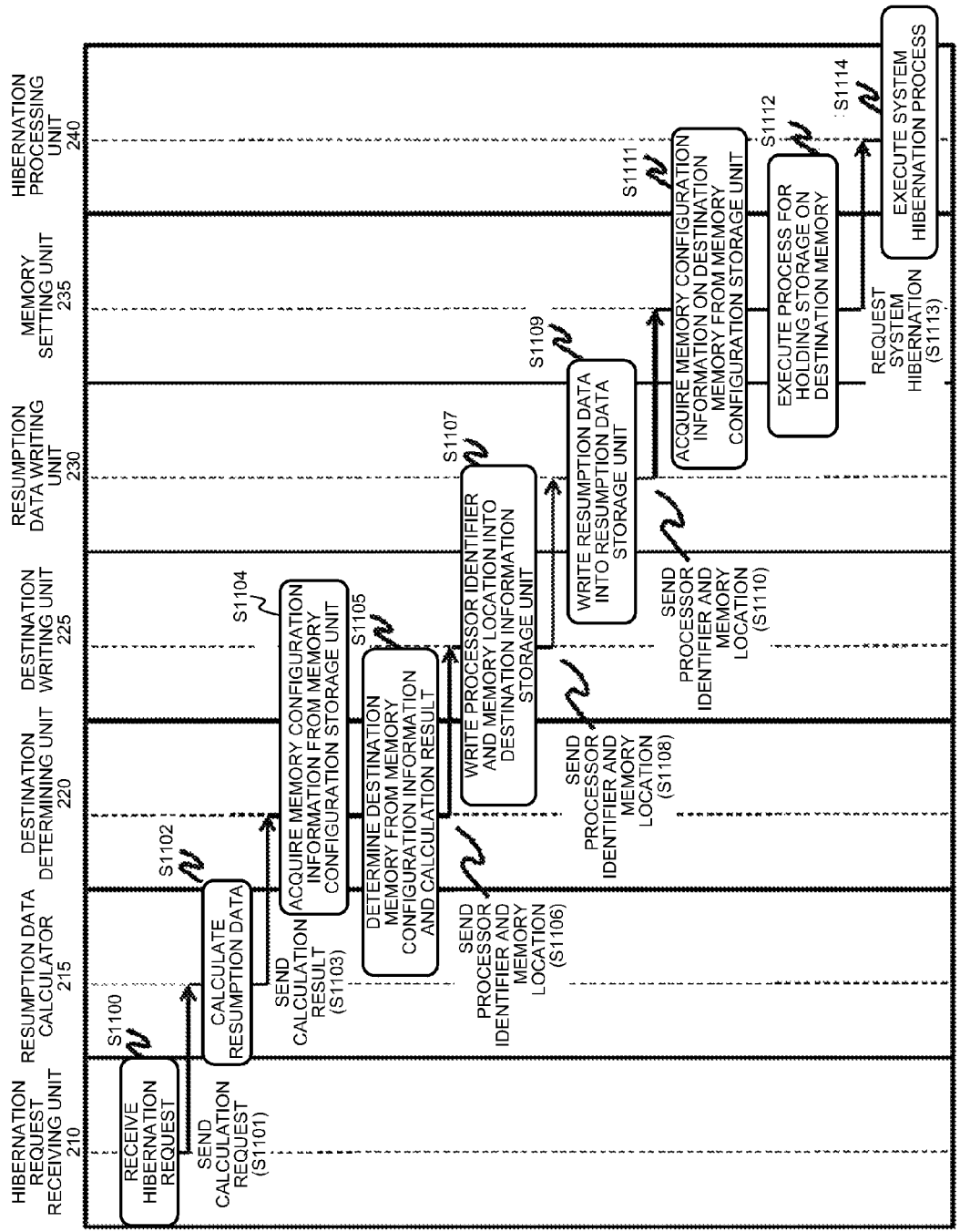
FIG. 6 is a diagram illustrating exemplary operation of a server receiving a hibernation request according to the first embodiment.

FIG. 6 is a sequence diagram illustrating an example of operation procedures of the server 15 in receipt of a request for hibernating the system. For example, a server administrator notifies the server 15 of the hibernation request by using internal or external interruption or the like to hibernate the server 15. The hibernation request receiving unit 210 then receives the hibernation request (step S1100).

The hibernation request receiving unit 210 in receipt of the hibernation request sends a calculation request to the resumption data calculator 215 (step S1101).

The resumption data calculator 215 reads out resumption data necessary for resuming the system and calculates the data amount thereof (step S1102).

The resumption data calculator 215 then sends the data amount that is the calculation result to the destination determining unit 220 (step S1103).

The destination determining unit 220 acquires memory configuration information from the memory configuration storage unit 170 (step S1104).

Subsequently, the destination determining unit 220 determines a destination memory that is a memory into which data is to be stored on the basis of the acquired memory configuration information and the calculation result from the resumption data calculator 215 (step S1105).

The destination determining unit 220 then sends the processor identifier of the processor to which the determined destination memory is connected and the memory location of the destination memory out of the memory configuration information on the destination memory to the destination writing unit 225 (step S1106).

The destination writing unit 225 writes the processor identifier and the memory location notified from the destination determining unit 220 into the destination information storage unit 180 (step S1107).

The destination writing unit 225 then sends the processor identifier and the memory location for the destination memory to the resumption data writing unit 230 (step S1108).

The resumption data writing unit 230 writes the resumption data into the memory (a memory included in the resumption data storage unit 185) associated with the processor identifier and the memory location for the destination memory notified by the destination writing unit 225 (step S1109).

The resumption data writing unit 230 then sends the processor identifier and the memory location for the destination memory to the memory setting unit 235 (step S1110).

The memory setting unit 235 acquires from the memory configuration storage unit 170 the memory configuration information associated with the processor identifier and the memory location for the destination memory notified by the resumption data writing unit 230 (step S1111).

Subsequently, the memory setting unit 235 executes a process for keeping data in the destination memory (step S1112).

The memory setting unit 235 then request the hibernation processing unit 240 to hibernate the system (step S1113).

Figure 7:
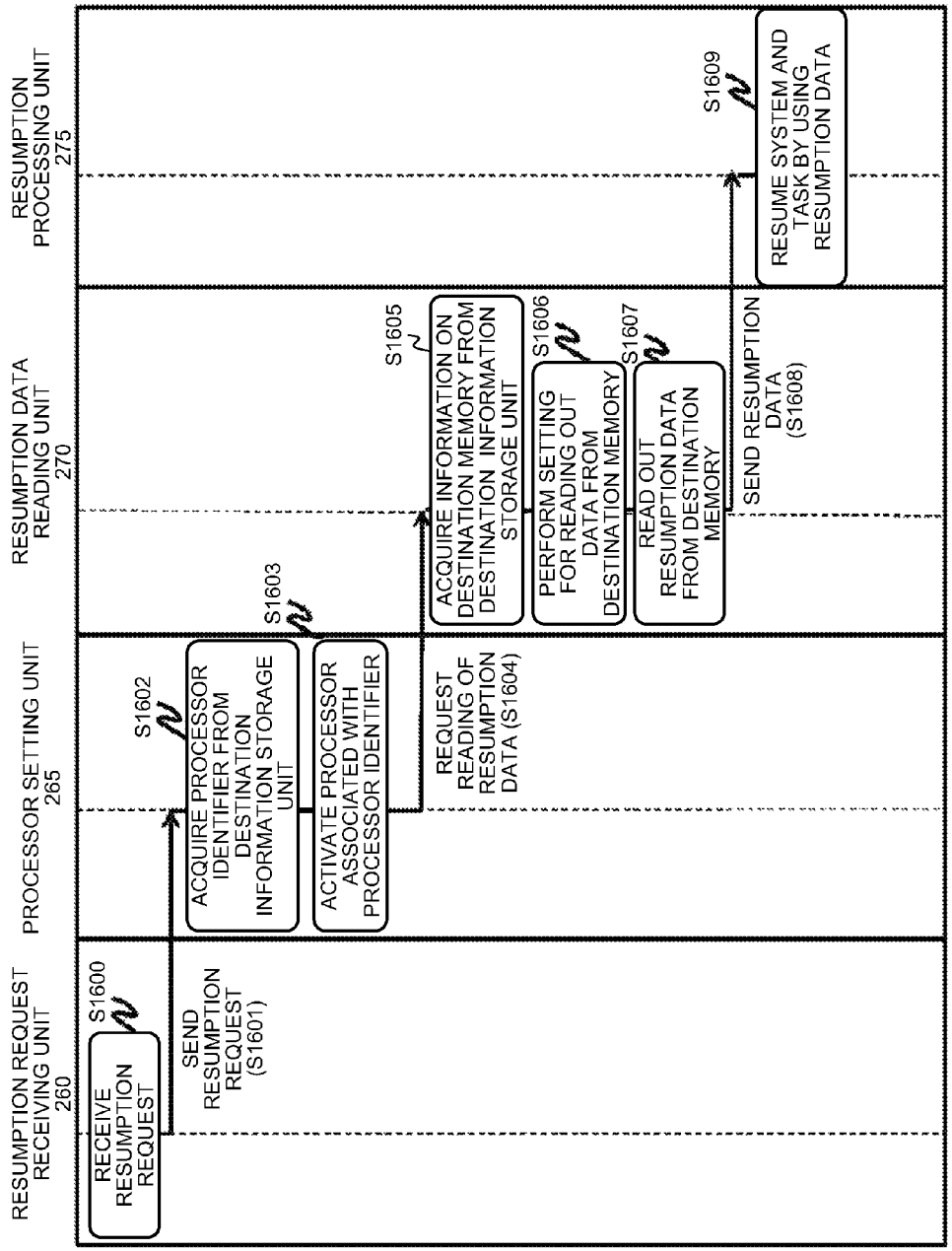
FIG. 7 is a diagram illustrating exemplary operation of a server receiving a resumption request according to the first embodiment.

The hibernation processing unit 240 in receipt of the request for hibernating the system causes the system to be into hibernation (step S1114). In the present embodiment, the hibernation of the system refers to a state in which the server 15 continues power supply to components necessary for receiving a system resumption request and stops power supply to the other devices included in the server 15. Specifically, the server 15 continues power supply only to volatile memories storing resumption data necessary for storing data and to modules that receive a system resumption request necessary for system resumption, and stops power supply to the other components (such as processors, nonvolatile memories, and devices). As illustrated in FIG. 5, for example, when destination memories are determined, the server 15 supplies power only to the volatile memories 113$d$ and 114$d$ out of the destination memories. Thus, the hibernation processing unit 240 stops power supply to most of the components included in the server 15. FIG. 7 is a sequence diagram illustrating an example of operation procedures of the server 15 in receipt of a system resumption request. For example, a server administrator notifies the server 15 of the resumption request by using external interruption or the like to resume the server 15. The resumption request receiving unit 260 then receives this resumption request (step S1600).

The resumption request receiving unit 260 in receipt of the resumption request sends the resumption request to the processor setting unit 265 (step S1601).

If the destination information storage unit 180 is not readable/writable, the processor setting unit 265 performs setting for reading out data from the destination information storage unit 180 (not illustrated). If the memory area is a volatile memory, the processor setting unit 265 changes from the self-refresh mode to the readable mode (not illustrated). If the memory area is a nonvolatile memory, the processor setting unit 265 turns on power supply thereto so that the nonvolatile memory becomes readable (not illustrated). Subsequently, the processor setting unit 265 acquires the processor identifier necessary for reading the memory storing the resumption data from the destination information storage unit 180 (step S1602).

Subsequently, the processor setting unit 265 activates the processor associated with the acquired processor identifier (step S1603). In FIG. 5, for example, the processor 110 having the processor identifier 1 and the processor 120 having the processor identifier 2 are activated.

The processor setting unit 265 then sends a request for reading the resumption data to the resumption data reading unit 270 (step S1604).

The resumption data reading unit 270 acquires information on the destination memory from the destination information storage unit 180 (step S1605).

Subsequently, the resumption data reading unit 270 performs setting for reading out data from the destination memory (step S1606). For example, if the memory from which data is to be read is an MRAM, the resumption data reading unit 270 turns on power supply to the memory, so that data can be read. If the memory from which data is to be read is a DRAM, the resumption data reading unit 270 changes from the self-refresh mode to the normal mode, so that data can be read.

Subsequently, the resumption data reading unit 270 reads out the resumption data from the destination memory (resumption data storage unit 185) (step S1607).

The resumption data reading unit 270 then sends the resumption data to the resumption processing unit 275 (step S1608).

If the memory configuration storage unit 170 is not readable/writable, the resumption processing unit 275 sets the memory configuration storage unit 170 to allow reading/writing of data in preparation for the process for stopping the system (not illustrated). If the memory to be set is a volatile memory, the resumption processing unit 275 changes from the self-refresh mode to the readable/writable mode (not illustrated). If the memory to be set is a nonvolatile memory, the resumption processing unit 275 turns on power supply thereto so that the nonvolatile memory becomes readable/writable (not illustrated). The resumption processing unit 275 also resumes the system and execution of tasks by using the resumption data notified by the resumption data reading unit 270 (step S1609). In step S1609, the resumption processing unit 275 may resume only the system by using the resumption data notified by the resumption data reading unit 270.

According to the present embodiment, as described above, storing resumption data into a memory allows the system to resume at high speed. Furthermore, since the resumption data necessary for resuming the system is calculated and the processors and the memories to be used for resumption are determined according to the result of the calculation, the numbers of processors and memories necessary for resuming the system can be minimized. In other words, according to the present embodiment, it is possible to reduce power consumption of the server 15 necessary for hibernating the system or resuming the system and to hibernate and resume the system at high speed.

Second Embodiment

While data necessary for resuming the system and that for resuming the tasks are not distinguished from each other in the first embodiment described above, data necessary for resuming the system and data necessary for resuming the tasks are distinguished from each other in the second embodiment. Specific details will be hereinafter described. Parts that are the same as those in the first embodiment will be designated by the same reference numerals and description thereof will not be repeated as appropriate.

Figure 8:
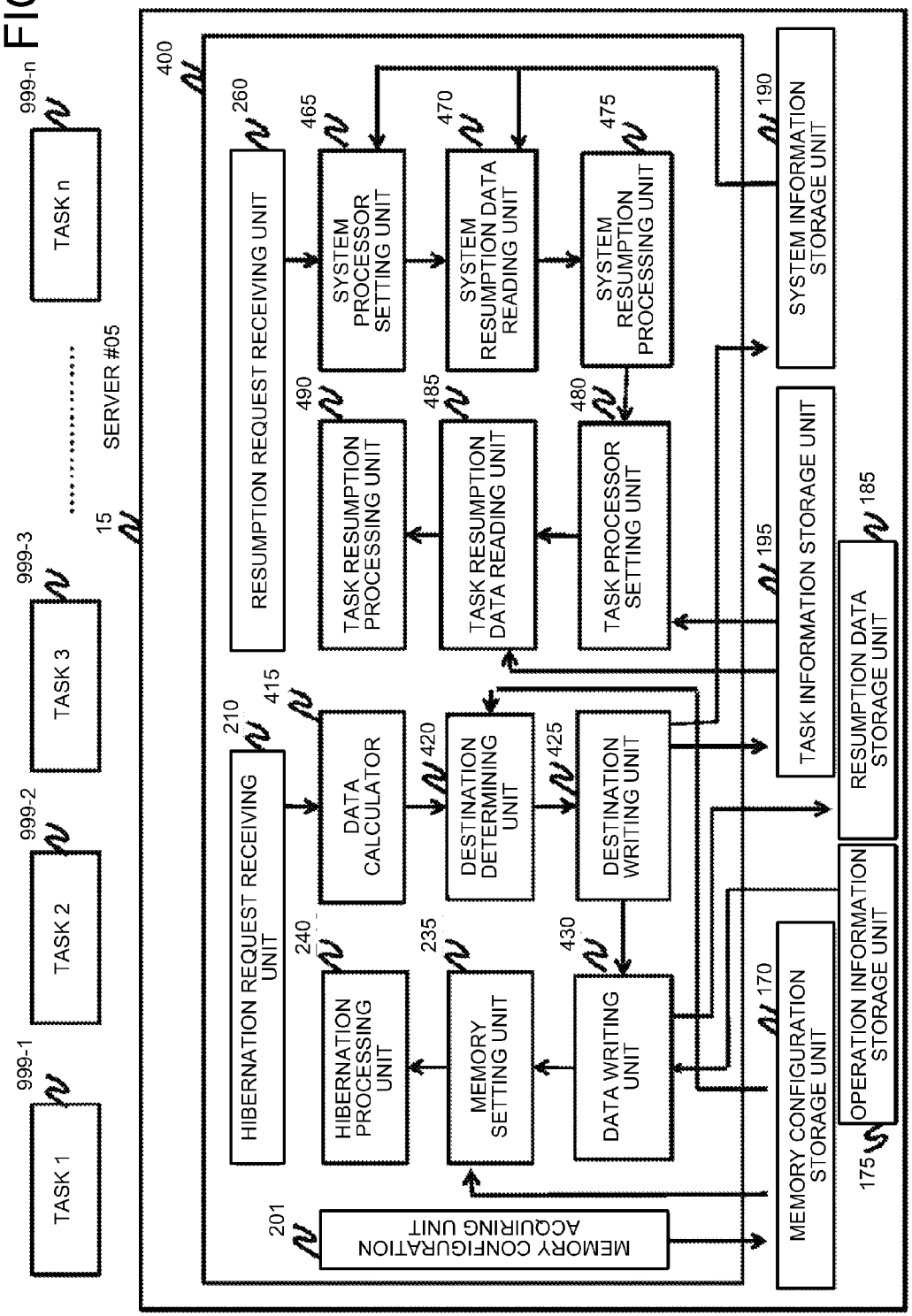
FIG. 8 is a diagram illustrating exemplary hardware and software configurations of a server according to a second embodiment.

FIG. 8 is a block diagram illustrating exemplary hardware and software configurations of the server 15. A control device 400 is realized by running a program on the OS.

Herein, it can be deemed that a single OS runs on a processor 100 and the OS processes one or more tasks (999-1 to 999-*n*). Furthermore, it is expressed in FIG. 8 that the server 15 includes the control device 400 running on the server 15 with the hardware included in the server 15, and one or more tasks to be processed by the control device 400.

As illustrated in FIG. 8, the hardware included in the server 15 includes a memory configuration storage unit 170, the operation information storage unit 175, the resumption data storage unit 185, a system information storage unit 190, and a task information storage unit 195. The system information storage unit 190 stores a processor identifier and a memory location indicating the memory storing system resumption data, which will be described later, and the processor to which the memory is connected.

FIG. 9 is a diagram illustrating an example of the data stored in the system information storage unit 190. In the example of FIG. 9, the processor identifier 1 and memory locations 1 to 3 are stored as the memories storing the system resumption data.

The description is continued referring back to FIG. 8. The task information storage unit 195 stores a processor identifier and a memory location indicating the memory storing task resumption data, which will be described later, and the processor to which the memory is connected.

FIG. 10 is a diagram illustrating an example of the data stored in the task information storage unit 195. In the example of FIG. 10, the processor identifier 2 and a memory location 1, and the processor identifier 3 and a memory location 1 are stored as memories storing the task resumption data and processors to which the memories are connected.

The description is continued referring back to FIG. 8 again. As illustrated in FIG. 8, the control device 400 includes the memory configuration acquiring unit 201, the hibernation request receiving unit 210, a data calculator 415, a destination determining unit 420, a destination writing unit 425, the memory setting unit 235, the hibernation processing unit 240, the resumption request receiving unit 260, a system processor setting unit 465, a system resumption data reading unit 470, a system resumption processing unit 475, a task processor setting unit 480, a task resumption data reading unit 485, and a task resumption processing unit 490.

The data calculator 415 calculates the location of system resumption data that has to be stored for system resumption. The data calculator 415 also calculates the data amount to be held for task resumption from resumption task data that has to be stored for task resumption. For example, the data calculator 415 calculates the amount of resumption data at least on the basis of the amount of programs themselves and the amount of data processed by the programs.

The destination determining unit 420 determines one or more task data destination memories that are memories included in the task information storage unit 195 storing the task resumption data from the data stored in the memory configuration storage unit 170 and the location of the task resumption data calculated by the resumption data calculator 215. The destination determining unit 420 also determines one or more system data destination memories that are memories included in the system information storage unit 190 storing system resumption data on the basis of the data stored in the memory configuration storage unit 170 and the data amount of the system resumption data calculated by the resumption data calculator 215. Examples of the data stored in the memory configuration storage unit 170 include the processor identifier and the memory location in association with one another, and the memory type.

The destination determining unit 420 determines a task data destination memory and a system data destination memory so that the power consumption required to hibernate the system and the power consumption required to resume the system are minimized. For determining the destination memories, the locations can be determined depending on whether the data is system resumption data for resuming the system or task resumption data for resuming a task.

For a server including a plurality of processors, assignment of tasks to be executed to the respective processors is considered. If the task resumption data is stored in a memory included in a certain processor, a task to be hibernated has to be copied from the processor executing the task to the memory into which the task is to be stored as the task resumption data. Furthermore, for resuming a task, the task has to be copied from the memory storing the task resumption data to the memory included in the processor that executes the task. Thus, by keeping data for resuming the task in the memory included in the processor executing the task, the time and the power consumption required for copying can be reduced. In contrast, system resumption data for resuming the system are collected to a certain location since the system cannot be resumed without the data, so that the power consumption required for resuming the system can be reduced.

The destination determining unit 420 may determine a memory connected to a certain processor as a system data destination memory.

For example, a case where a processor 102 executes a task 1 and a processor 103 executes a task 2 is assumed. In such a system, system resumption data necessary for resuming the system is collected to the memories (the processor identifier 1, memory locations 1 to 3) connected to a certain processor, which is a processor 101 in this example, as illustrated in FIG. 9. As a result, the processor to be resumed for system resumption is only the processor 101, and thus the number of processors necessary for resuming the system can be reduced.

The destination determining unit 420 may also determine a nonvolatile memory connected to the processor executing a task as a task data destination memory.

For example, for resuming a task, it is determined to place data necessary for resuming the task 1 into the memory (the processor identifier 2, memory location 1) that is included in the processor 102 and that is a nonvolatile memory, and data necessary for resuming the task 2 into a memory (the processor identifier 3, memory location 1) included in the processor 103 and that is a nonvolatile memory) as illustrated in FIG. 10. As a result, the processors to be activated for resuming the tasks are the processor 102 and the processor 103. Since, however, these processors are also used after resuming the tasks, even if the processors are activated to resume the tasks, the cost for activating the processors for resuming the tasks are deemed to be sufficiently smaller than that for copying a memory.

The destination writing unit 425 writes information (the processor identifier, the memory location) on the destination memory determined by the destination determining unit 420 into the task information storage unit 195. The destination writing unit 425 also writes information (the processor identifier, the memory location) on the destination memory determined by the destination determining unit 420 into the system information storage unit 190.

A resumption data writing unit 430 stores system resumption data and task resumption data to be stored for system resumption and task resumption into the destination memories determined by the destination determining unit 420. More specifically, the resumption data writing unit 430 reads out the system resumption data and the task resumption data out of the operation information from the operation information storage unit 175, and stores the system resumption data and the task resumption data into the destination memories determined by the destination determining unit 420.

The hibernation processing unit 240 stops power supply to all the components included in the target system 15 except the memories and the modules necessary for receiving a resumption request.

The resumption request receiving unit 260 receives a resumption request. More specifically, the resumption request receiving unit 260 receives an interruption notification (a signal indicating that an interruption will occur) from inside or outside of the server 15.

The system processor setting unit 465 reads out the processors stored in the system information storage unit 190, and activates the processors necessary for system resumption. The system resumption data reading unit 470 reads out the system resumption data on the basis of the processor and the memory location stored in the system information storage unit 190. The system resumption processing unit 475 resumes the system by using the system resumption data read out by the system resumption data reading unit 470.

The task processor setting unit 480 reads out the processor identifier stored in the task information storage unit 195 and activates the processor necessary for task resumption. The task resumption data reading unit 485 reads out the task resumption data on the basis of the processor and the memory location stored in the task information storage unit 195. The task resumption processing unit 490 resumes execution of the task by using the task resumption data read out by the task resumption data reading unit 485.

Figure 11:
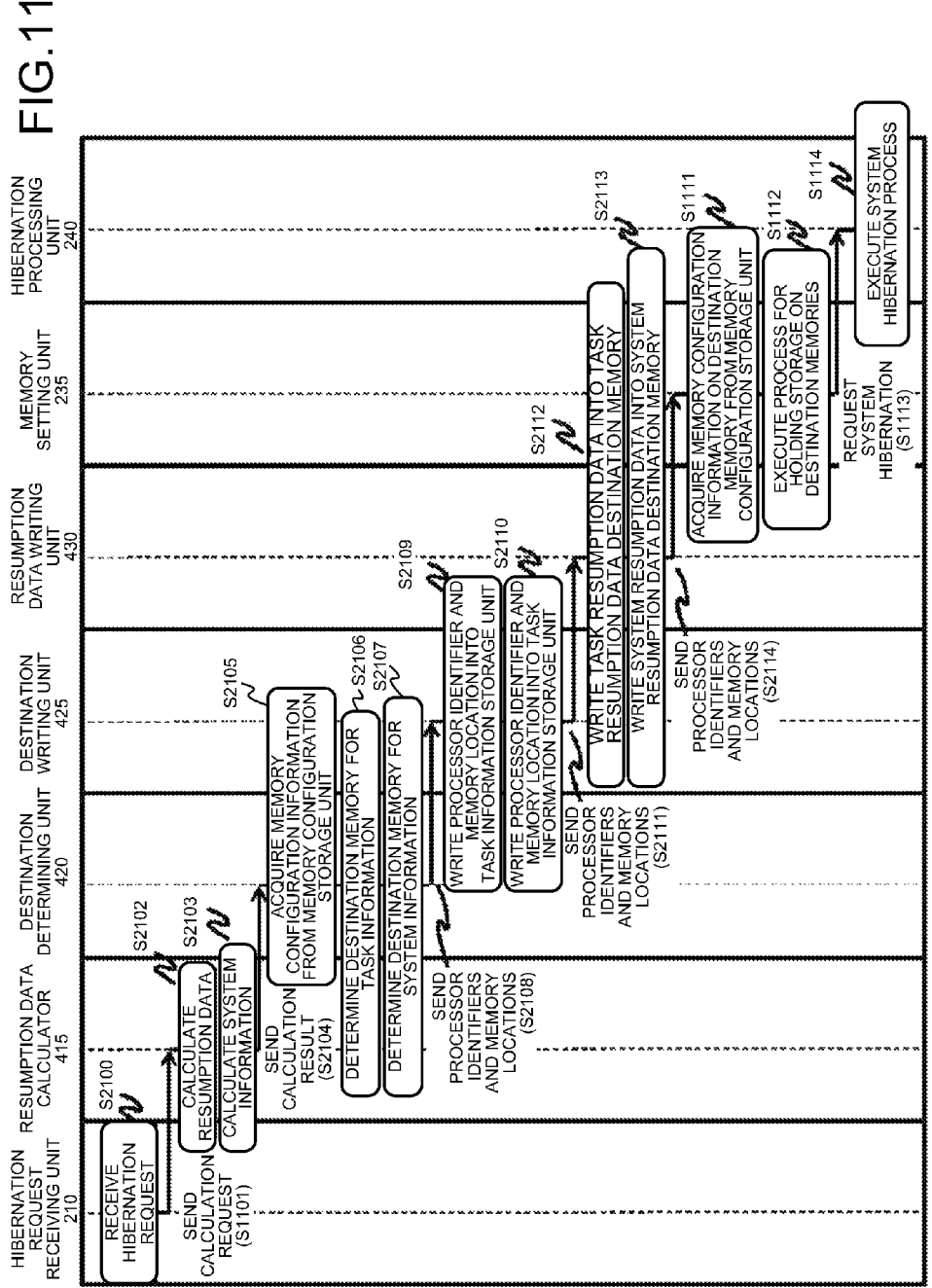
FIG. 11 is a diagram illustrating exemplary operation of a server receiving a hibernation request according to the second embodiment.

FIG. 11 is a sequence diagram illustrating an example of operation procedures of the server 15 in receipt of a request for hibernating the system. For example, a server administrator notifies the server 15 of the hibernation request by using internal or external interruption or the like to hibernate the server 15. The hibernation request receiving unit 210 then receives the hibernation request (step S2100). The hibernation request receiving unit 210 in receipt of the hibernation request sends a calculation request to the data calculator 415 (step S2101). The data calculator 415 calculates the data amount of the system resumption data that has to be stored for system resumption (step S2102). Subsequently, the data calculator 415 calculates the location and the amount of the task resumption data that has to be stored for task resumption (step S2103). The data calculator 415 then sends the calculation results to the destination determining unit 420 (step S2104).

The destination determining unit 420 acquires memory configuration information from the memory configuration storage unit 170 (step S2105). Subsequently, the destination determining unit 420 determines a task resumption destination memory that is a memory into which the task resumption data is to be stored on the basis of the acquired memory configuration information and the calculation result on the task resumption data from the data calculator (step S2106). The destination determining unit 420 also determines a system resumption destination memory that is a memory into which the system resumption data is to be stored on the basis of the acquired memory configuration information and the calculation result on the system resumption data from the data calculator (step S2107). The destination determining unit 420 then sends the processor identifiers of the processors to which the determined destination memories are connected and the memory locations of the destination memories out of the memory configuration information on the task resumption destination memory and the system resumption destination memory to the destination writing unit 425 (step S2108).

The destination writing unit 425 writes the processor identifier and the memory location of the processor to which the memory for storing the task resumption data is connected that are notified by the destination determining unit 420 into the task information storage unit 195 (step S2109). Subsequently, the destination writing unit 425 writes the processor identifier and the memory location of the processor to which the memory for storing the system resumption data is connected that are notified by the destination determining unit 420 into the system information storage unit 190 (step S2110). The destination writing unit 425 then sends the processor identifiers and the memory locations of the processors connected to the system resumption data destination memory and the task resumption data destination memory to the resumption data writing unit 430 (step S2111).

The resumption data writing unit 430 writes the task resumption data into the processor and the memory location of the task resumption data destination memory notified by the destination writing unit 425 (step S2112). Subsequently, the resumption data writing unit 430 writes the system resumption data into the processor and the memory location of the system resumption data destination memory notified by the destination writing unit 425 (step S2113). The resumption data writing unit 430 then sends the processor identifiers and the memory locations of the processors for the respective destination memories of the task resumption data and the system resumption data to the memory setting unit 235 (step S2114).

Since processing in step S2114 and subsequent steps is the same as that in step S1110 and subsequent steps in FIG. 6, detailed description thereof will not be repeated.

As a result, the server 15 continues power supply only to components necessary for storing data, specifically volatile memories storing system resumption data and task resumption data and to modules necessary for system resumption, specifically modules that receive a system resumption request, and the server 15 does not supply power to the other components (such as processors, nonvolatile memories, and devices).

Figure 12:
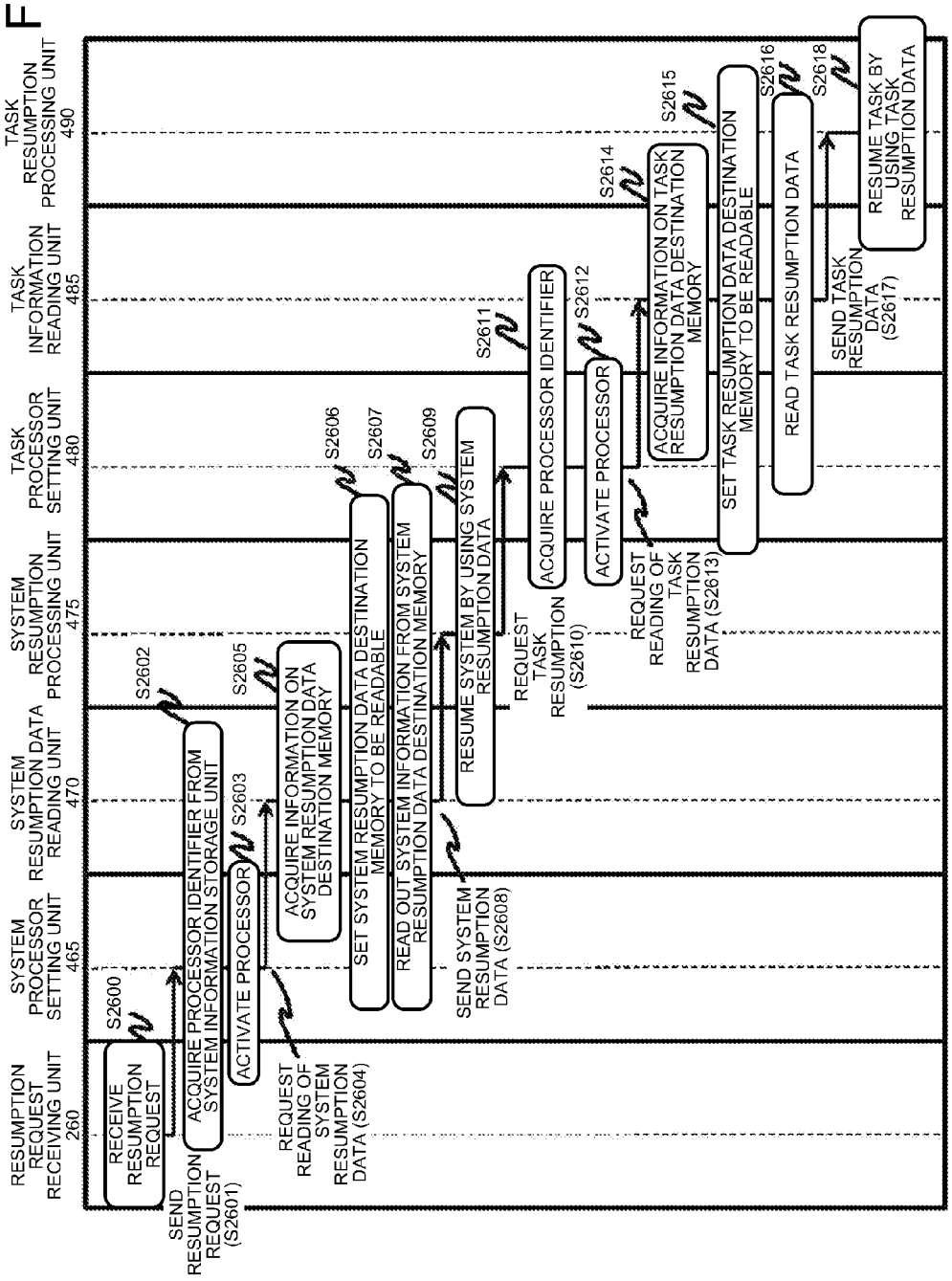
FIG. 12 is a diagram illustrating exemplary operation of a server receiving a resumption request according to the first embodiment.

FIG. 12 is a sequence diagram illustrating an example of operation procedures of the server 15 in receipt of a system resumption request. For example, a server administrator sends the resumption request to the server 15 by using external interruption or the like to resume the server 15. The resumption request receiving unit 260 then receives this resumption request (step S2600). The resumption request receiving unit 260 in receipt of the resumption request sends the resumption request to the system processor setting unit 465 (step S2601).

If the system information storage unit 190 is not readable/writable, the system processor setting unit 465 performs setting for reading out data from the system information storage unit 190 (not illustrated). If the memory area is a volatile memory, the system processor setting unit 465 changes from the self-refresh mode to the readable mode (not illustrated). If the memory area is a nonvolatile memory, the system processor setting unit 465 turns on power supply thereto, so that the nonvolatile memory becomes readable (not illustrated). Subsequently, the system processor setting unit 465 acquires the processor identifier necessary for reading the memory storing the system resumption data from the system information storage unit 190 (step S2602). Subsequently, the system processor setting unit 465 activates the processor having the acquired processor identifier (step S2603). The system processor setting unit 465 then requests the system resumption data reading unit 470 to read the system resumption data (step S2604).

The system resumption data reading unit 470 acquires information on the system resumption data destination memory storing the system resumption data from the system information storage unit 190 (step S2605). Subsequently, the system resumption data reading unit 470 performs setting for reading out data from the system resumption data destination memory. For example, if the memory from which data is to be read is an MRAM, the system resumption data reading unit 470 turns on power supply to the memory, so that data can be read. If the memory from which data is to be read is a DRAM, the system resumption data reading unit 470 changes from the self-refresh mode to the normal mode, so that data can be read (step S2606). Subsequently, the system resumption data reading unit 470 reads out the system resumption data from the system resumption data destination memory (step S2607). At this point, the server 15 supplies power to processors and memories necessary for system execution but does not supply power to processors and memories necessary for task execution.

The system resumption data reading unit 470 then sends the system resumption data to the system resumption processing unit 475 (step S2608).

The system resumption processing unit 475 resumes the system by using the system resumption data notified by the system resumption data reading unit 470 (step S2609). Subsequently, the system resumption processing unit 475 notifies the task processor setting unit 480 of the task resumption request (step S2610).

If the task information storage unit 195 is not readable/writable, the task processor setting unit 480 performs setting for reading out data from the task information storage unit 195 (not illustrated). If the memory area is a volatile memory, the task processor setting unit 480 changes from the self-refresh mode to the readable mode (not illustrated). If the memory area is a nonvolatile memory, the task processor setting unit 480 turns on power supply thereto so that the nonvolatile memory becomes readable (not illustrated). Subsequently, the task processor setting unit 480 acquires the processor identifier necessary for reading the memory storing the task resumption data from the task information storage unit 195 (step S2611). Subsequently, the task processor setting unit 480 activates the processor having the acquired processor identifier (step S2612). The task processor setting unit 480 then sends a request for reading the task resumption data to the task resumption data reading unit 485 (step S2613).

The task resumption data reading unit 485 acquires information on the task resumption data destination memory storing the task resumption data from the task information storage unit 195 (step S2614). Subsequently, the task resumption data reading unit 485 performs setting for reading out data from the task resumption data destination memory (step S2615). For example, if the memory from which data is to be read is an MRAM, the task resumption data reading unit 485 turns on power supply to the memory, so that data can be read. If the memory from which data is to be read is a DRAM, the task resumption data reading unit 485 changes from the self-refresh mode to the normal mode, so that data can be read. The task resumption data reading unit 485 reads out task resumption data from the task resumption data destination memory (step S2616). The task resumption data reading unit 485 then sends the task resumption data to the task resumption processing unit 490 (step S2617).

If the memory configuration storage unit 170 is not readable/writable, the system resumption processing unit 490 sets the memory configuration storage unit 170 to allow reading/writing of data in preparation for the process for stopping the system (not illustrated). If the memory to be set is a volatile memory, the system resumption processing unit 490 changes from the self-refresh mode to the readable/writable mode (not illustrated). If the memory to be set is a nonvolatile memory, the system resumption processing unit 490 turns on power supply thereto so that the nonvolatile memory becomes readable/writable (not illustrated). The system resumption processing unit 490 also resumes the tasks by using the task resumption data notified by the task resumption data reading unit 485 (step S2618). At this point, the server 15 supplies power to processors and memories necessary for system execution and task execution.

According to the present embodiment, as described above, management of data necessary for resuming the system and data necessary for resuming the tasks separately allows the system and the tasks to resume at high speed. Since the data amount of the resumption data necessary for resuming the system is calculated and the processors and the memories to be used for resumption are determined according to the result of the calculation, the numbers of processors and memories necessary for resuming the system can be minimized. Furthermore, since the memories connected to the processor executing a task are used for data necessary for resuming the task, unnecessary copy of memories in system resuming can be avoided. In other words, according to the present embodiment, it is possible to reduce power consumption of the server 15 necessary for hibernating the system or resuming the system and to hibernate and resume the system at high speed.

Third Embodiment

While hibernation and resuming of a system and tasks are performed within the same processing device in the first embodiment described above, a system and tasks are resumed at a processing device by using resumption data generated when the system and the tasks are hibernated at another processing device in the third embodiment. Specific details will be hereinafter described. Parts that are the same as those in the first embodiment will be designated by the same reference numerals and description thereof will not be repeated as appropriate.

Figure 13:
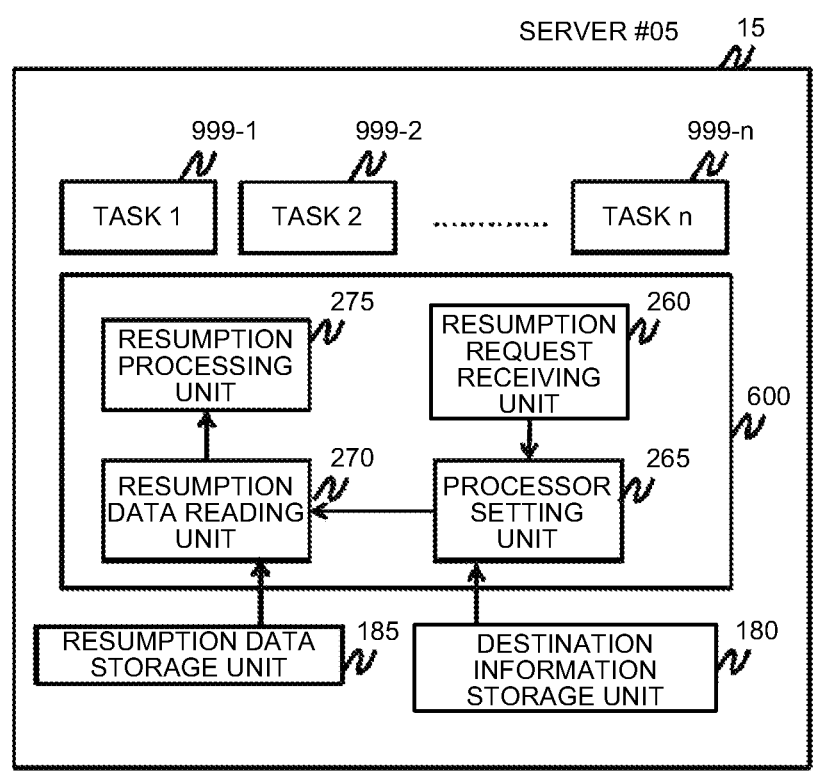
FIG. 13 is a diagram illustrating exemplary hardware and software configurations of a server according to a third embodiment.

FIG. 13 is a block diagram illustrating exemplary hardware and software configurations of the server 15. Thus, FIG. 13 is a block diagram illustrating a control device 600 and hardware included in the server 15. The control device 600 is realized by running a program on the OS. Herein, it can be deemed that a single OS runs on the server 15 and one or more tasks (999-1 to 999-*n*) run on the OS. Furthermore, it is expressed in FIG. 13 that the server 15 includes the OS running on the server 15 with the hardware included in the server 15, and one or more tasks that run on the OS.

As illustrated in FIG. 13, the hardware included in the server 15 includes the memory configuration storage unit 170, the destination information storage unit 180, and the resumption data storage unit 185. The memory configuration storage unit 170 stores a processor identifier, a memory location indicating the number of the memory, and a memory type indicating whether the memory is nonvolatile or volatile in association with one another. The destination information storage unit 180 stores a processor and a memory location indicating the memory storing resumption data, which will be described later. The control device 600 includes the resumption request receiving unit 260, the processor setting unit 265, the resumption data reading unit 270, and the resumption processing unit 280.

According to the present embodiment, as described above, a system and tasks are resumed at a processing device by using resumption data generated at another processing device, allowing the system to be resumed at high speed while saving power similarly to the first embodiment.

Modifications

While certain embodiments have been described, the embodiments described above have been presented by way of example only and are not intended to limit the scope of the inventions. Indeed, the novel devices, and programs described herein may be embodied in a variety of other forms; furthermore, various omission, substitutions and changes in the form of the systems and programs described herein may be made without departing from the spirit of the inventions. The accompanying claims and their equivalents are intended to cover such forms or modifications as would fall within the scope and spirits of the inventions.

Figure 14:
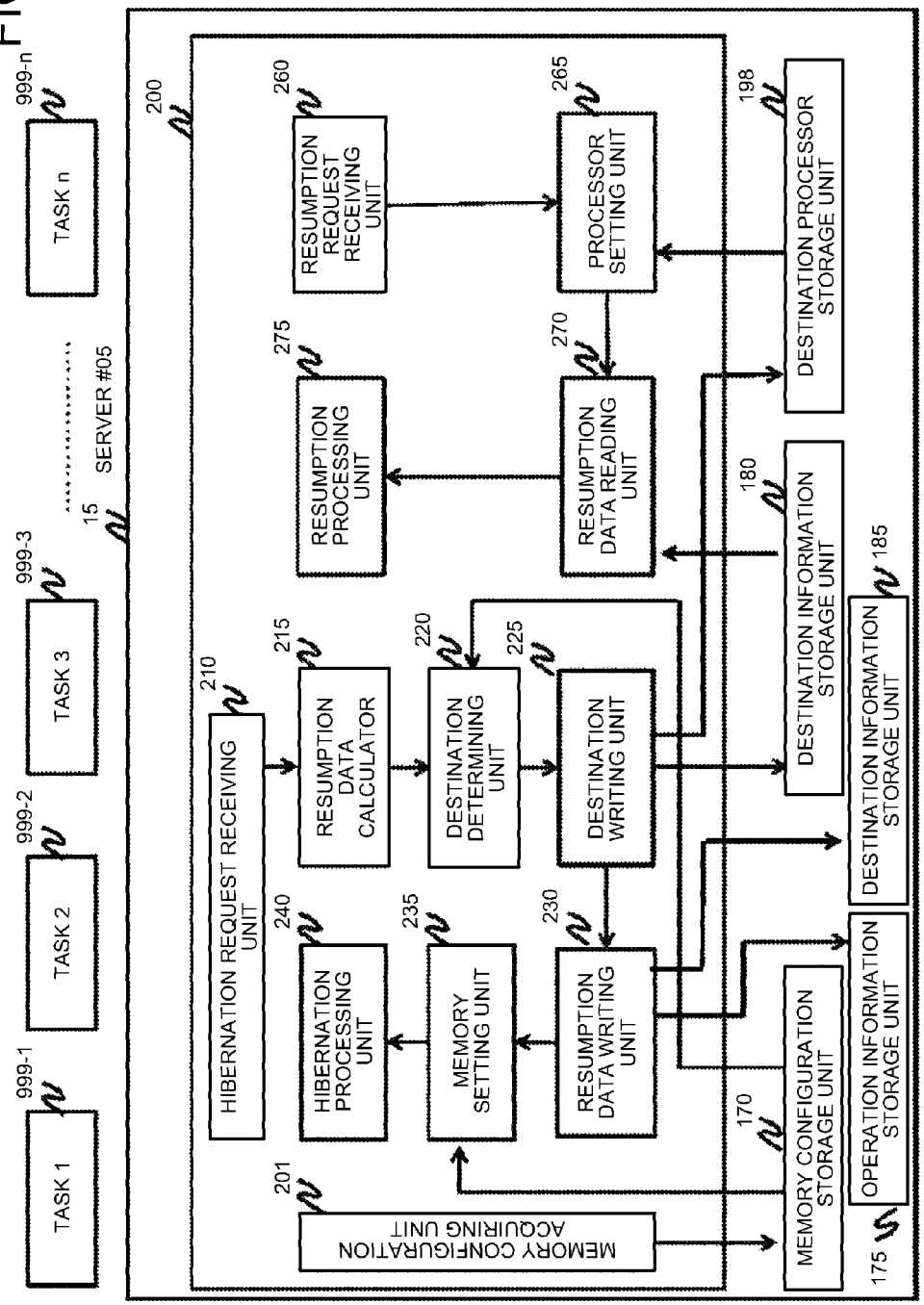
FIG. 14 is a diagram illustrating exemplary hardware and software configurations of a server according to a modification.

For example, although the processor identifier and the memory location for activating a processor and indicating the location of the memory from which resumption data is to be read are stored in the same area of the destination information storage unit 180 in the first embodiment described above, the processor identifier used to activate the processor may be stored separately. FIG. 14 is a diagram illustrating exemplary hardware and software configurations of the target system (the server) 15 where the processor identifier and the memory location are stored separately. A storage processor managing unit 198 stores a processor to which a destination memory storing resumption data is connected.

Furthermore, although the processor identifier and the memory location are used to identify a destination memory storing resumption data in the embodiments described above, any other method may be used as long as the memory storing resumption data can be identified. Furthermore, any other method other than that using the processor identifier may be used as long as the processor to which the memory storing resumption data is connected can be identified.

Figure 15:
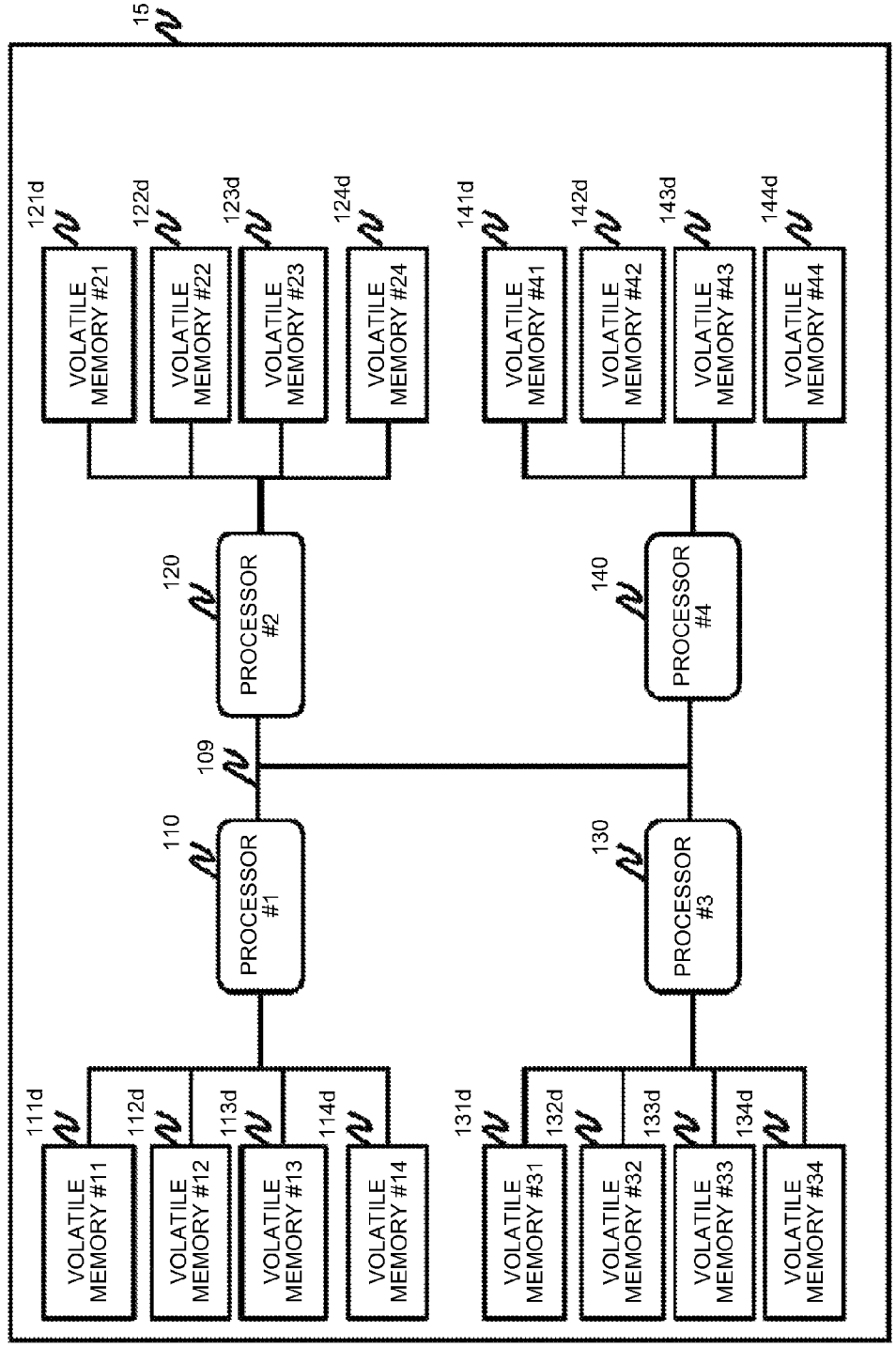
FIG. 15 is a diagram illustrating an exemplary schematic configuration of a server in which the memory in the modification is a volatile memory.
Figure 16:
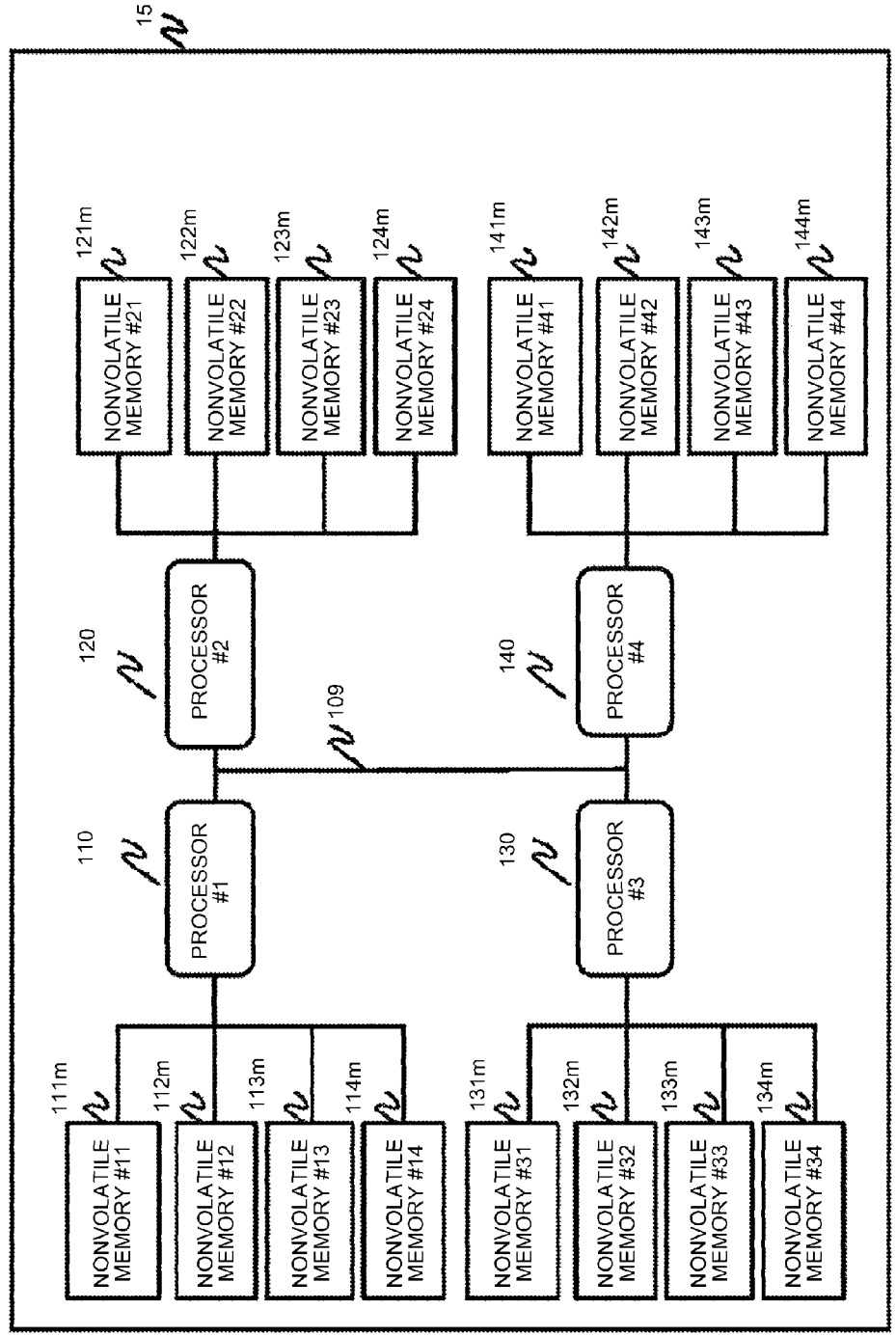
FIG. 16 is a diagram illustrating an exemplary schematic configuration of a server in which the memory in the modification is a nonvolatile memory.

For example, while nonvolatile memories and volatile memories are mixed in the first embodiment described above, memories connected to a server may all be volatile memories as illustrated in FIG. 15, memories connected to a server may all be nonvolatile memories as illustrated in FIG. 16. In this case, the memory configuration information stored in the memory configuration storage unit 170 only includes the processor to which the memory is connected and the memory location as illustrated in FIG. 17. Furthermore, the destination determining unit 220 selects memories in the same processor as storage locations of resumption data. This is because the memories are of the same type, eliminating the need for considering the data retention characteristics that are different between nonvolatile memories and volatile memories. Similarly, while nonvolatile memories and volatile memories are mixed in the first embodiment described above, the memories may all be nonvolatile memories. Similarly, in this case, the memory configuration information stored in the memory configuration storage unit 170 only includes the processor to which the memory is connected and the memory location as illustrated in FIG. 17. Furthermore, the destination determining unit 220 selects memories in the same processor as storage locations of resumption data.

Figure 18:
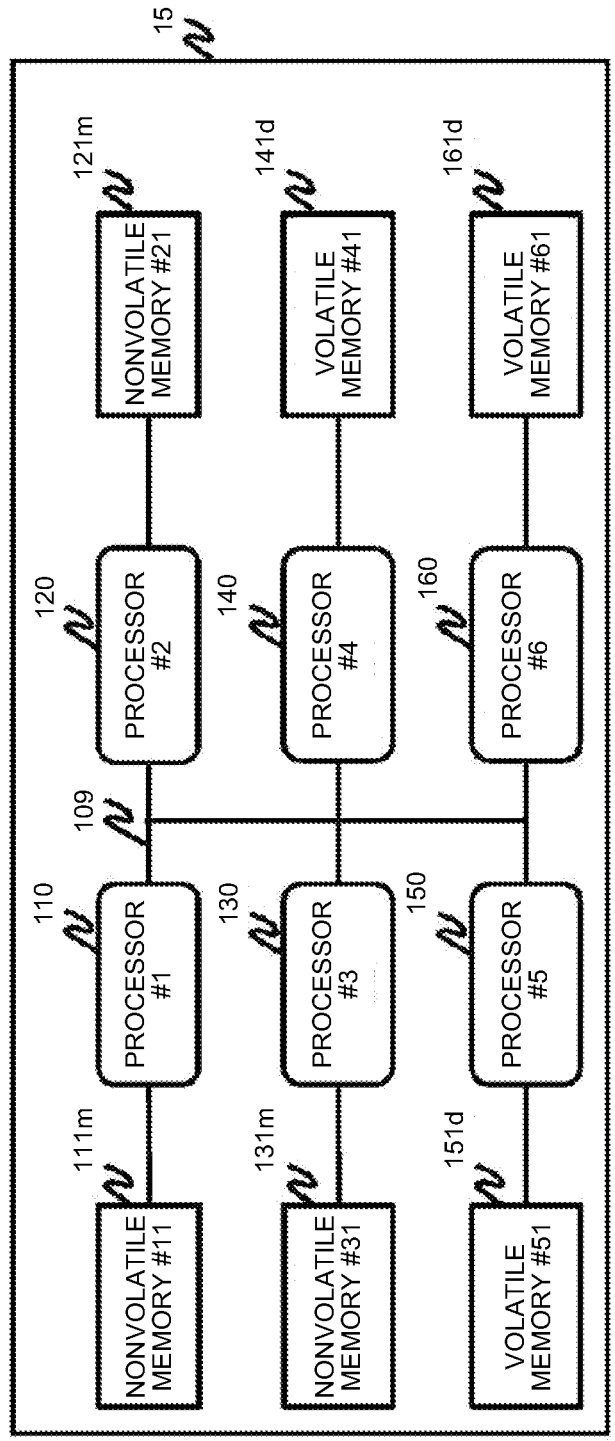
FIG. 18 is a diagram illustrating an exemplary schematic configuration of a server in which one memory is connected to one processor according to the modification.

While four memories are connected to one processor in the first embodiment described above, the configuration may be such that one memory is connected to one processor as illustrated in FIG. 18, for example. In this case, the memory configuration information stored in the memory configuration storage unit 170 only includes the processor to which the memory is connected and the memory type as illustrated in FIG. 19. Furthermore, the destination determining unit 220 selects nonvolatile memories as the storage locations of resumption data. This is because only one memory is connected to a processor and another memory connected to the same processor cannot be selected, eliminating the need for considering whether the memories are connected to the same processor.

Furthermore, while the processor 100 includes one processor and four memories in the embodiments described above, the configuration is not limited thereto and the processor 100 may include two processors each of which includes eight memories, for example.

Furthermore, while the memory configuration storage unit 170, the destination information storage unit 180, the system information storage unit 190, and the task information storage unit 195 are set to be readable/writable when necessary in the embodiments described above, the setting is not limited thereto and may be performed at a time when the server 15 receives a system resumption request. Alternatively, the setting may be performed when any one of the components needs to be readable/writable. If the impact of the setting is significant, the memories may remain readable/writable during system hibernation.

Furthermore, in the embodiments described above, the memory configuration storage unit 170, the destination information storage unit 180, the resumption data storage unit 185, the system information storage unit 190, the task information storage unit 195, the destination memories, the system resumption data destination memories, the task resumption data destination memories may be in the form of one memory or may be in the form of different memories.

In the form of one memory, the setting of the memory for power saving is performed when use of the memory is terminated. For example, if destination memories are memories with the processor identifier 1 and the memory location 1, and the processor identifier 1 and the memory location 2 and if the destination information storage unit is a memory with the processor identifier 1 and the memory location 1 in the first embodiment described above, the memory setting unit 235 sets the memory with the processor identifier 1 and the memory location 2 and the hibernation processing unit 240 sets the memory with the processor identifier 1 and the memory location 1. Memories are similarly set when other storage units are in the same memory.

Furthermore, setting of a memory for reading/writing data from/to a storage unit is performed when the memory is used after hibernation. For example, if destination memories are memories with the processor identifier 1 and the memory location 1, and the processor identifier 1 and the memory location 2 and if the destination information storage unit 180 is a memory with the processor identifier 1 and the memory location 2 in the first embodiment described above, the processor setting unit 265 sets the memory with the processor identifier 1 and the memory location 2 and the resumption data reading unit 270 sets the memory with the processor identifier 1 and the memory location 1. Memories are similarly set when other storage units are in the same memory.

Thus, if storage units are in the same memory, the memory may be set immediately after use of the memory is terminated when the system is to be hibernated and may be set immediately before using the memory when the system is to be resumed.

Cases where the embodiments described above have advantageous effects will be described below. To effectively save energy of a system including multiple servers, hibernation of servers and processor cores is not sufficient. Some servers of the multiple servers are hibernated (cold standby) in terms of power saving while other servers are in operation (warm standby) so as to be immediately operable when loads on another server increases in terms of maintaining the response time. In this warm standby state, the servers are in operation even when the conventional technologies are used, which results in large power consumption. David Meisner et al., "PowerNap: Eliminating Server Idle Power", ACM ASPLOS 2009, introduces means for reducing the number of servers in operation to be as small as possible, but still requires servers in the warm standby state and cannot save power of such servers. Anil Rao, "SeaMicro Technology Overview", http://www.seamicro.com/sites/default/files/SM_TO01_64_v2.5.pdf, 2012, introduces a method of limiting the processor cores and memories that operate, which saves power of servers in operation but cannot be applied to servers in the warm standby state. In such cases, the invention according to the embodiments described above can save more power.

The techniques described in the embodiments can be stored in a form of programs that can be executed by a computer into a storage medium such as a magnetic disk (a floppy (registered trademark) disk, a hard disk, etc.), an optical disk (a CD-ROM, a DVD, etc.), a magneto-optical disk (MO), or a semiconductor memory and distributed, as a computer program product.

The storage medium may be in any form of storage as long as the storage medium, as a computer program product, is capable of storing programs and readable by a computer.

Furthermore, an operating system (OS) running on a computer according to a program installed in the computer from a storage medium, middleware (MW) such as database management software and network software, virtual environment such as a virtual machine monitor configured to manage multiple OSs, or the like may execute some or all of the processes for realizing the embodiments.

Furthermore, the storage medium according to the embodiments is not limited to a medium independent of a computer but includes a storage medium that downloads programs transmitted via a LAN or the Internet and stores or temporarily stores the downloaded programs.

Moreover, the number of storage mediums is not limited to one, but the storage medium according to the invention may also include multiple storage media from which processes according to the embodiments are executed and the media may have any configuration.

Note that the computer according to the embodiments executes the processes in the embodiments on the basis of programs stored in the storage media, and may have any configuration, which may be in the form of one device such as a personal computer or a system in which multiple devices are connected via a network.

Furthermore, the computer according to the embodiments is not limited to a personal computer, but also includes an arithmetic processing device included in an information processing device, a microcomputer, etc., and generally refers to equipment and devices capable of realizing the functions according to the invention using programs.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A control device comprising:
   a processor setting unit configured to, in response to a resumption request for resuming an information processing system from hibernation, the information processing system including a plurality of processors, the plurality of processors being not supplied with power during the hibernation, each processor being directly connected to one or more memories, and a first processor of the plurality of processors being directly connected to a memory storing resumption data for resuming the information processing system,
   identify the first processor directly connected to the memory storing the resumption data for resuming the information processing system, and
   activate the first processor;
   a resumption data reading unit configured to read the resumption data from the memory that stores the resumption data; and
   a resumption processing unit configured to resume the information processing system including a second processor of the plurality of processors by using the read resumption data.

2. A control device comprising:
   a processor setting unit configured to, in response to a resumption request for resuming an information processing system from hibernation, the information processing system including two or more processors, the two or more processors being not supplied with power during the hibernation, each processor being directly connected to one or more memories, and only a first processor of the two or more processors being directly connected to a memory storing resumption data for resuming the information processing system and a task that is executed by the information processing system,
   identify the first processor directly connected to the memory storing the resumption data for resuming the information processing system and the task that is executed by the information processing system and
   activate the first processor;
   a resumption data reading unit configured to read the resumption data from the memory that stores the resumption data; and
   a resumption processing unit configured to resume the information processing system including a second processor of the two or more processors and the task by using the read resumption data.

3. The device according to claim 2, further comprising a destination determining unit configured to determine a memory for storing the resumption data for resuming the information processing system and the task.

4. The device according to claim 3, wherein the destination determining unit is configured to determine the memory for storing the resumption data so that a number of processors necessary for resuming the information processing system are minimum.

5. The device according to claim 3, wherein the destination determining unit is configured to determine the memory for storing the resumption data so that a nonvolatile memory is used as the memory as far as possible.

6. The device according to claim 3, wherein the destination determining unit is configured to determine a memory connected to a processor to which more nonvolatile memories are connected as the memory for storing the resumption data.

7. The device according to claim 3, further comprising a memory setting unit configured to set a memory whose type is volatile among the memories determined by the destination determining unit to a self-refresh mode and to suspend power supply to the other memories.

8. A control device comprising:
   a destination determining unit configured to determine a memory for storing resumption data for resuming an information processing system and a task executed by the information processing system, in response to a hibernation request for hibernating the information processing system, the information processing system including two or more processors each directly connected to one or more memories, the two or more processors being not supplied with power during hibernation, and only a first processor of the two or more processors being directly connected to the memory for storing the resumption data;
   a resumption data writing unit configured to store the resumption data into the determined memory;
   a processor setting unit configured to identify the first processor to which the memory that stores the resumption data is directly connected and to activate the first processor in response to a restart request for resuming the information processing system from hibernation;
   a resumption data reading unit configured to read the resumption data from the memory that stores the resumption data; and
   a resumption processing unit configured to resume the information processing system including a second processor of the two or more processors and the task by using the read resumption data.

9. The device according to claim 8, wherein the destination determining unit is configured to determine the memory for storing the resumption data so that a number of processors necessary for resuming the information processing system are minimum.

10. The device according to claim 8, wherein the destination determining unit is configured to determine the memory for storing the resumption data so that a nonvolatile memory is used as the memory as far as possible.

11. The device according to claim 8, wherein the destination determining unit is configured to determine a memory connected to a processor to which more nonvolatile memories are connected as the memory for storing the resumption data.

12. The device according to claim 8, further comprising a memory setting unit configured to set a memory whose type is volatile among the memories determined by the destination determining unit to a self-refresh mode and to suspend power supply to the other memories.

13. A control device comprising:
a destination determining unit configured to determine a memory for storing system resumption data for resuming an information processing system and to determine a memory for storing task resumption data for resuming a task that is executed by the information processing system, in response to a cause of hibernation of the information processing system, the information processing system including two or more processors, the two or more processors being not supplied with power during the hibernation, each directly connected to one or more memories, and only a first processor of the two or more processors being directly connected to the memory for storing the system resumption data;
a resumption data writing unit configured to write the system resumption data into the memory for storing the system resumption data and to write the task resumption data into the memory for storing the task resumption data;
a system processor setting unit configured to activate the first processor directly connected to the memory that stores the system resumption data for resuming the information processing system including a second processor of the two or more processors when a cause of resumption of the information processing system from hibernation occurs;
a system resumption data reading unit configured to read the system resumption data from the memory that stores the system resumption data determined by the destination determining unit;
a system resumption processing unit configured to resume the information processing system by using the system resumption data read by the system resumption data reading unit;
a task processor setting unit configured to identify the first processor directly connected to the memory that stores task resumption data for resuming a task determined by the destination determining unit after the information processing system is resumed by the system resumption processing unit, and to activate the first processor;
a task resumption data reading unit configured to read the task resumption data from the memory that stores the task resumption data determined by the destination determining unit; and
a task resumption processing unit configured to resume the task by using the task resumption data read by the task resumption data reading unit.

14. The device according to claim 13, wherein the destination determining unit is configured to determine a memory connected to the processor that executes the task before system hibernation prior to the other memories as the memory for storing the task resumption data.

15. The device according to claim 13, further comprising a memory setting unit configured to set a memory whose type is nonvolatile among the memories determined by the destination determining unit to a self-refresh mode and to suspend power supply to the other memories.

16. A computer program product comprising a non-transitory computer-readable medium containing a program executed by a computer, the program causing the computer to execute:
in response to a resumption request for resuming an information processing system from hibernation, the information processing system including two or more processors, the two or more processors being not supplied with power during the hibernation, each processor being directly connected to one or more memories, and only a first processor of the two or more processors being directly connected to a memory storing resumption data for resuming the information processing system,
identifying the first processor directly connected to the memory storing resumption data for resuming the information processing system and activating the first processor;
reading the resumption data from the memory that stores the resumption data; and
resuming the information processing system including a second processor of the two or more processors by using the read resumption data.

* * * * *